United States Patent
Nielsen et al.

(10) Patent No.: US 9,366,222 B2
(45) Date of Patent: Jun. 14, 2016

(54) ROTOR BLADE ELEMENT AND METHOD FOR IMPROVING THE EFFICIENCY OF A WIND TURBINE ROTOR BLADE

(75) Inventors: Soeren E. Nielsen, Shanghai (CN); Carsten Thrue, Braedstrup (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 516 days.

(21) Appl. No.: 13/814,547

(22) PCT Filed: Oct. 18, 2010

(86) PCT No.: PCT/EP2010/065646
§ 371 (c)(1),
(2), (4) Date: Feb. 6, 2013

(87) PCT Pub. No.: WO2012/019655
PCT Pub. Date: Feb. 16, 2012

(65) Prior Publication Data
US 2013/0129519 A1  May 23, 2013

(30) Foreign Application Priority Data

Aug. 10, 2010 (EP) ..................................... 10172377

(51) Int. Cl.
*F03D 11/02* (2006.01)
*F03D 1/00* (2006.01)
*F03D 1/06* (2006.01)

(52) U.S. Cl.
CPC *F03D 1/00* (2013.01); *F03D 1/001* (2013.01); *F03D 1/065* (2013.01); *F03D 1/0633* (2013.01); *F03D 1/0675* (2013.01); *F05B 2230/50* (2013.01); *F05B 2240/122* (2013.01); *F05B 2240/301* (2013.01); *F05B 2240/311* (2013.01); *F05B 2250/11* (2013.01); *F05B 2250/183* (2013.01); *F05B 2260/96* (2013.01); *F05B 2280/6003* (2013.01); *F05C 2253/04* (2013.01); *Y02E 10/721* (2013.01); *Y02P 70/523* (2015.11); *Y10T 29/49337* (2015.01); *Y10T 156/10* (2015.01)

(58) Field of Classification Search
CPC ..................................... F01D 5/14; F03D 1/06
USPC ......................................................... 416/228
See application file for complete search history.

(56) References Cited

U.S. PATENT DOCUMENTS

| 5,328,329 A | 7/1994 | Monroe |
| 7,931,444 B2* | 4/2011 | Godsk et al. .................. 416/228 |
| 2003/0099546 A1* | 5/2003 | Stiesdal et al. ................ 416/228 |
| 2008/0080977 A1* | 4/2008 | Bonnet .................... F03D 3/061 416/229 A |

(Continued)

FOREIGN PATENT DOCUMENTS

| CN | 1936320 A | 3/2007 |
| DE | 19647102 A1 | 5/1998 |

(Continued)

*Primary Examiner* — Dwayne J White
*Assistant Examiner* — Jason Mikus

(57) ABSTRACT

A rotor blade element and a method for improving the efficiency of a wind turbine rotor blade are provided. The wind turbine rotor blade element is adapted for mounting on the wind turbine rotor blade. The wind turbine rotor blade has a trailing edge, a suction side and a pressure side. The blade element has a trailing edge, a first surface and a second surface. The first surface forms a pressure side surface portion. The second surface has a suction side surface portion and a contact surface.

11 Claims, 4 Drawing Sheets

(56) References Cited

U.S. PATENT DOCUMENTS

2008/0187442 A1    8/2008   Althoff
2010/0143151 A1    6/2010   Drobietz

FOREIGN PATENT DOCUMENTS

| | | |
|---|---|---|
| DE | 102006034831 A1 | 2/2007 |
| DE | 102007006643 A1 | 8/2008 |
| EP | 0652367 A1 | 5/1995 |
| EP | 1775464 A2 | 4/2007 |
| EP | 1314885 B1 | 8/2007 |
| EP | 2031242 A1 | 3/2009 |
| EP | 2195525 A1 | 6/2010 |
| JP | 2000120524 A | 4/2000 |
| WO | WO 03076802 A1 | 9/2003 |
| WO | WO 2009026929 A1 | 3/2009 |

* cited by examiner

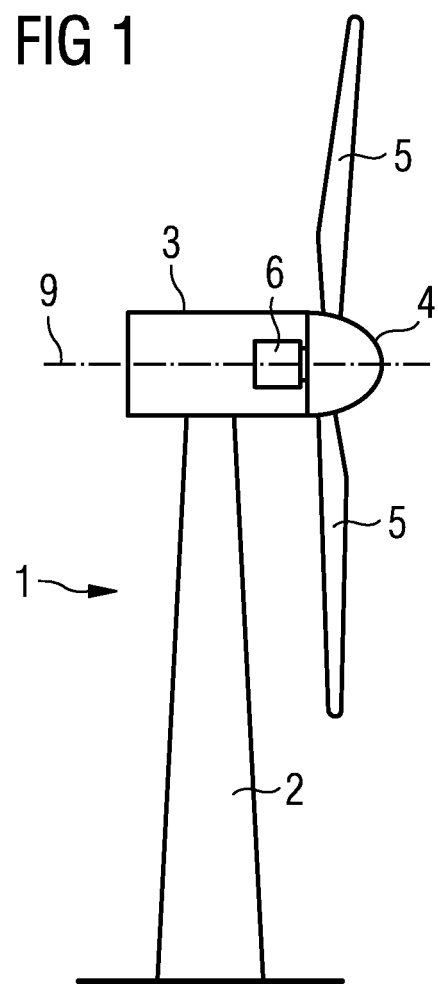

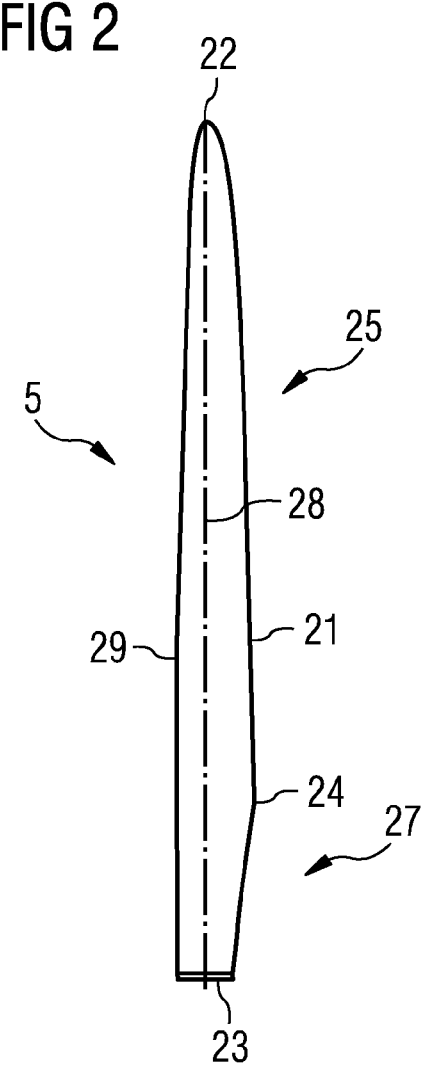
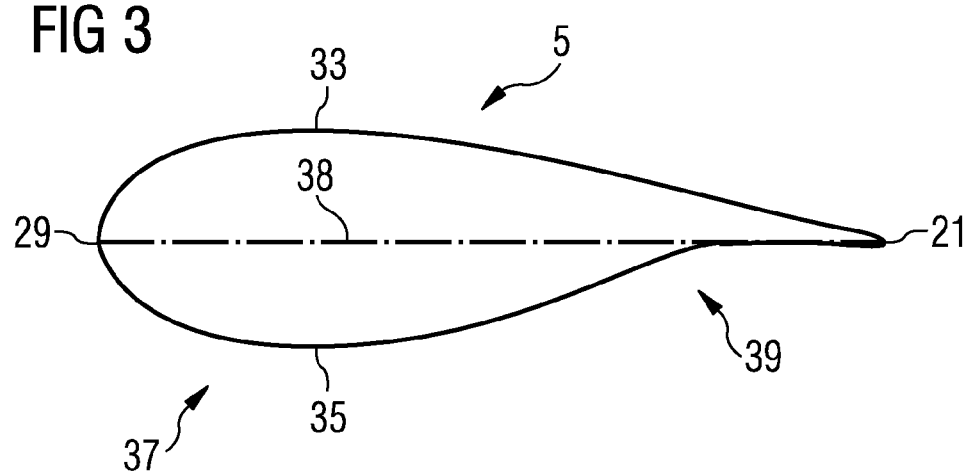

ROTOR BLADE ELEMENT AND METHOD FOR IMPROVING THE EFFICIENCY OF A WIND TURBINE ROTOR BLADE

CROSS REFERENCE TO RELATED APPLICATIONS

This application is the US National Stage of International Application No. PCT/EP2010/065646 filed Oct. 18, 2010 and claims the benefit thereof. The International Application claims the benefits of European application No. 10172377.3 filed Aug. 10, 2010, both of the applications are incorporated by reference herein in their entirety.

FIELD OF THE INVENTION

The present invention relates to rotor blade element, especially a wind turbine rotor blade element, a wind turbine rotor blade, a wind turbine and a method for improving the efficiency of a wind turbine rotor blade.

BACKGROUND OF THE INVENTION

Blade elements provided for improving the efficiency and for changing the aerodynamic profile of a wind turbine rotor blade and such elements mounted to a trailing edge of a blade are well known from patent literature. Example hereof are EP 1 314 885 B, EP 2 195 525 A, WO 2009/026929 A1, EP 2 031 242 A1, US 2010/143151 A, EP 1 775 464 A and U.S. Pat. No. 5,328,329 A. The elementary features like normal elastic trailing edge or serrated edge are also much known from the cited literature.

In US 2010/0143151 A1 a wind turbine blade is disclosed, which includes a permeable flap extending from a trailing edge of the blade. The flap can be retrofit to existing blades and may flush with the outer surface of the blade.

In U.S. Pat. No. 5,328,329 a width extender is provided, which is used to modify existing fan blades in order to enable them to rotate at slower speed thereby reducing the noise associated with them while at the same time maintaining proper work efficiency. The width extender is fixably connected along the trailing edge of an existing fan blade by, for example, adhesive bonding.

In EP 2 195 525 A, WO 2009/026929 A1 and EP 2 031 242 A1 a blade element for mounting on a wind turbine blade is provided. The blade element has a shape so that, by mounting in a first longitudinal part of the wind turbine blade, it changes the profile of the first longitudinal part from the first airfoil profile with an essentially pointed trailing edge and a first chord length to a changed airfoil profile with a blunt trailing edge. The changed airfoil profile is a truncated profile of an imaginary airfoil profile with an essentially pointed trailing edge and a second chord length which is larger than the first chord length.

In EP 1 775 464 A2 a wind turbine with a blade rotor which reduces noise by the inclusion of a set of flexible bristles is disclosed. The set of flexible bristles is aligned in at least one row on the trailing edge of the aerodynamic profile of the blade and protrudes over it.

In EP 1 314 885 B1 a method and an apparatus for improving the efficiency of a wind turbine rotor are disclosed. The wind turbine rotor comprises a serrated panel connected to each wind turbine rotor blade, an upper and a lower surface on each panel, a plurality of span-wise, periodic indentations on each panel, means for connecting the serrated panel to a trailing edge on each of the wind turbine rotor blades of the wind turbine rotor such that the serrated panel extends from the trailing edge into airflow behind the trailing edge. The serrations on each wind turbine rotor blade have an angle different from 0° relative to a mounting surface on each of the wind turbine rotor blades. The serrations on each of the serrated panels have a given stiffness allowing for an angle of the serrations to change passively in response to speed and angle of the airflow at the trailing edge of each of the wind turbine rotor blades due to flexing of the serrations and the serrated panel.

SUMMARY OF THE INVENTION

It is a first objective of the present invention to provide a rotor blade element which improves the efficiency of a wind turbine rotor blade and reduces noise during operation of a wind turbine rotor blade. It is a second objective of the present invention to provide a wind turbine rotor blade with an improved efficiency and reduced noise during operation. A third objective is to provide a wind turbine with improved efficiency and reduced noise during operation. It is a forth objective of the present invention to provide a method for improving the efficiency of a wind turbine rotor blade.

The objectives are solved by the independent claims. The depending claims define further developments of the invention. All described features are advantageous individually or in any combination with each other.

The inventive rotor blade element is adapted for mounting it on a wind turbine rotor blade. The wind turbine rotor blade comprises a trailing edge, a suction side and a pressure side. The blade element comprises a trailing edge, a first surface and a second surface. The first surface forms a pressure side surface portion. The second surface comprises a suction side surface portion and a contact surface. Preferably, the contact surface is adapted for connecting the rotor blade element to the pressure side of the rotor blade.

The inventive rotor blade element has the advantage that it is easy to fit to a rotor blade. Furthermore, it may preferably have a form that makes it a natural prolongation of a trailing surface or trailing edge of the rotor blade. The rotor blade may comprise a chord length which is defined as a length from the trailing edge to the leading edge of the blade. The inventive rotor blade element may prolong the chord length of the rotor blade by connecting an inventive rotor blade element to the trailing edge of the blade.

Furthermore, the inventive rotor blade element improves the efficiency of the rotor blade and reduces aerodynamic noise generated by a trailing edge of the rotor blade. Moreover, the inventive rotor blade element can be retro-fit to existing rotor blades. As the blade element may be made of a light weight material and/or may be limited in size, a high level of safety can be ensured if, for example, a blade element comes off from a height or falls down from a rotor blade.

Preferably, the inventive rotor blade element may comprise a trailing edge flange which is adapted for attaching the rotor blade element to the trailing edge of a wind turbine rotor blade. Preferably, the trailing edge flange is located between the contact surface and the suction side surface portion of the inventive rotor blade element. For example, the trailing edge flange may have the shape of an edge.

The trailing edge flange has the advantage that the suction side surface portion of the rotor blade element may flush with the suction side of the wind turbine rotor blade which is equipped with the inventive rotor blade element. Due to the trailing edge flange the suction side surface portion of the rotor blade element may form an even suction side surface with the suction side of the wind turbine rotor blade.

The first surface may comprise a curvature, preferably a concave curvature. The curvature can be adapted for prolonging the pressure side of a wind turbine rotor blade. The suction side surface portion of the inventive rotor blade element may also comprise a curvature, preferably a convex curvature. The curvature of the suction side surface portion may correspond to the curvature of the suction side of the wind turbine rotor blade. The curvature can be adapted for prolonging the suction side surface of the rotor blade. Furthermore, the contact surface of the inventive rotor blade element may comprise a curvature, preferably, a convex curvature. The curvature of the contact surface may correspond to the curvature of the pressure side of the blade. Advantageously, the contact surface can be adapted for being attached to part of the pressure side of the wind turbine rotor blade.

Moreover, the rotor blade element may comprise elastic material. For example, the rotor blade element may comprise plastic material and/or thermoplastic material and/or a composite structure, for example comprising glass fibre. Preferably, the inventive rotor blade element may be made of plastic material and/or thermoplastic material and/or a composite structure like, for example, glass fibre.

The inventive rotor blade element may elastically bend or deform along the trailing edge of the blade so as to follow the dynamic curvature of the blade to which it is attached during operation. The blade element may further elastically bend or deform in relation to the aero-dynamical influences, like for example wind speed or wind resistance, during operation of the rotor blade.

Making the blade element of light weight material and limiting the size of the blade element, a high level of safety is ensured, for example, if a blade element is dropped from a height or falls down from a rotor blade. Generally, the inventive rotor blade element can be produced by injecting moulding.

Moreover, the rotor blade element may have a length, for instance at its trailing edge, of between 0.4 m and 1.0 m. Generally, the inventive rotor blade element can be one long stripe or can be segmented, for example in approximately 0.4 to 1.0 m long segments when attached to a rotor blade. This makes the blade elements easier to handle. Furthermore, the rotor blade element can be extended along substantially the whole length of the trailing edge of the rotor blade or along only the most distal part such as the most distal 8 m, for instance measured from the tip of the blade.

The inventive rotor blade element may comprise a double-sided adhesive tape for fixing the rotor blade element to the rotor blade. Advantageously, the double-sided adhesive tape can be located at the contact surface. The inventive rotor blade element can be prepared for, and be mounted on the rotor blade by, for example, double-sided adhesive tape. Alternatively, it can be prepared for and be mounted on the rotor blade by glue or a combination of glue and double-sided adhesive tape. The rotor blade element can be mounted, for example glued or taped, on a rotor blade from factory or can be retro-fit.

The rotor blade element may have a serrated or straight trailing edge.

Furthermore for various embodiments of the invention, the blade element may be designed to comprise a winglet which may ensure to reduce the fall-speed through open air for a blade element which is falls down from a height. This in turn increases safety for personnel in the vicinity of a turbine which is equipped with the inventive rotor blade element. Therefore, the inventive rotor blade element may advantageously comprise a winglet.

The inventive rotor blade comprises at least one rotor blade element as previously described. For example, one rotor blade element can be attached to the trailing edge of the rotor blade. Alternatively, a number of rotor blade elements, for example formed as segments, may be attached to the trailing edge of the rotor blade.

Furthermore, the rotor blade may comprise a tip. The rotor blade element may extend along the whole length of the trailing edge of the rotor blade. Alternatively, the rotor blade element may extend along the length of the trailing edge of the rotor blade of at least 8 m measured from the tip.

The rotor blade element can be fixed to the rotor blade by glue and/or by tape, for instance by a double-sided adhesive tape.

The inventive wind turbine comprises at least one rotor blade, preferably three rotor blades, as previously described. Generally, the inventive rotor blade and the inventive wind turbine have the same advantages as previously mentioned in the context with the inventive rotor blade element.

The inventive method for improving the efficiency of a wind turbine rotor blade is related to a rotor blade which comprises a trailing edge. At least one inventive rotor blade element as previously described is mounted to the trailing edge of the wind turbine rotor blade. Preferably, the at least one rotor blade element is fixed to the rotor blade by glue and/or by tape, for instance by a double-sided adhesive tape. Furthermore, the at least one rotor blade element may be mounted to the trailing edge of a newly manufactured rotor blade or it may be retro-fitted to the trailing edge of an already used or previously manufactured rotor blade.

The inventive method has the same advantages as the previously described inventive rotor blade element.

BRIEF DESCRIPTION OF THE DRAWINGS

Further features, properties and advantages of the present invention will become clear from the following description of an embodiment in conjunction with the accompanying drawings. All mentioned features are advantageous separate or in any combination with each other.

FIG. 1 schematically shows a wind turbine.

FIG. 2 schematically shows a rotor blade in a plan view on the plane defined by the blade's span and the blade's chord.

FIG. 3 schematically shows a chord wise section through the airfoil portion of the blade shown in FIG. 2.

DETAILED DESCRIPTION OF THE INVENTION

Figure 4:
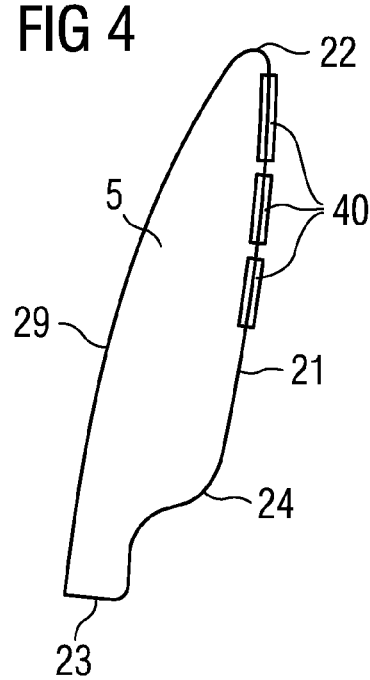
FIG. 4 schematically shows a rotor blade which is equipped with a number of inventive rotor blade elements.

FIG. 1 schematically shows a wind turbine 1. The wind turbine 1 comprises a tower 2, a nacelle 3 and a hub 4. The nacelle 3 is located on top of the tower 2. The hub 4 comprises a number of wind turbine blades 5. The hub 4 is mounted to the nacelle 3. Moreover, the hub 4 is pivot-mounted such that it is able to rotate about a rotation axis 9. A generator 6 is located inside the nacelle 3. The wind turbine 1 is a direct drive wind turbine.

FIG. 2 shows a wind turbine blade 5 as it is usually used in a three-blade rotor. However, the present invention shall not be limited to blades for three-blade rotors. In fact, it may as well be implemented in other rotors, e.g. one-blade rotors or two-blade rotors.

The rotor blade 5 shown in FIG. 2 comprises a root portion 23 with a cylindrical profile and a tip 22. The tip 22 forms the outermost part of the blade. The cylindrical profile of the root portion 23 serves to fix the blade to a bearing of a rotor hub 4. The rotor blade 5 further comprises a so-called shoulder 24 which is defined as the location of its maximum profile depth, i.e. the maximum chord length of the blade. Between the shoulder 24 and the tip 22 an airfoil portion 25 extends which has an aerodynamically shaped profile. Between the shoulder 24 and the cylindrical root portion 23, a transition portion 27 extends in which a transition takes place from the aerodynamic profile of the airfoil portion 25 to the cylindrical profile of the root portion 23. The span of the blade 5 is designated by reference numeral 28.

A chord-wise cross section through the rotor blade's airfoil section 25 is shown in FIG. 3. The aerodynamic profile shown in FIG. 3 comprises a convex suction side 33 and a less convex pressure side 35. The dash-dotted line extending from the blade's leading edge 29 to its trailing edge 21 shows the chord 38 of the profile. Although the pressure side 35 comprises a convex section 37 and a concave section 39 in FIG. 3, it may also be implemented without a concave section at all as long as the suction side 33 is more convex than the pressure side 35.

The suction side 33 and the pressure side 35 in the airfoil portion 25 will also be referred to as the suction side and the pressure side of the rotor blade 5, respectively, although, strictly spoken, the cylindrical portion 23 of the blade 5 does not show a pressure or a suction side.

FIG. 4 schematically shows a wind turbine rotor blade 5. A number of inventive rotor blade elements 40 are attached and fixed to the trailing edge 21 of the turbine blade 5. The rotor blade elements 40 are connected to the trailing edge 21 close to the tip 22. Preferably, the inventive rotor blade elements 40 cover or extend along at least 8 m of the trailing edge 21 measured from the tip 22.

Figure 5:
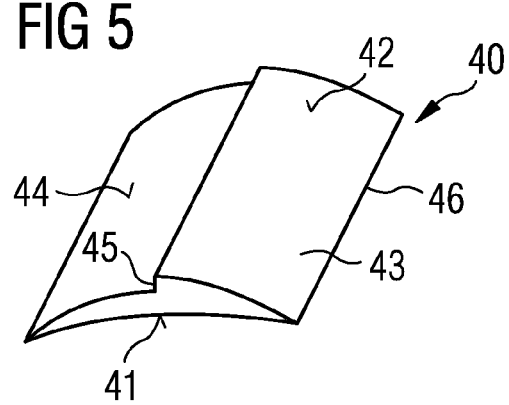
FIG. 5 schematically shows an inventive rotor blade element in a perspective view.

FIG. 5 schematically shows an inventive rotor blade element 40 in a perspective view. The rotor blade element 40 comprises a trailing edge 46, a first surface 41 and a second surface 42. The first surface 41 forms a pressure side surface portion, which can be adapted to flush with the pressure side 35 of the rotor blade 5. The second surface 42 comprises a suction side surface portion 43, which can be adapted to flush with the suction side 33 of the rotor blade 5, and a contact surface 44 for connecting the rotor blade element 40 to the pressure side 35 of the rotor blade 5.

The inventive rotor blade element 40 further comprises a trailing edge flange 45, which preferably has the shape of an edge which fits to the trailing edge 21 of the rotor blade 5.

The first surface 41 has a concave curvature corresponding to the curvature of part of the pressure side 35 of the rotor blade 5 to prolong the rotor blade 5 in its chord length 38. The suction side surface portion 43 has a convex curvature corresponding to the convex curvature of the suction side 33 of the rotor blade 5 to flush with the suction side 33 and to prolong the suction side 33 in chord direction 38. The contact surface 44 has a convex curvature corresponding to the curvature of the concave section 39 of the pressure side 35 to which the contact surface 44 is adapted to be attached to.

Figure 6:
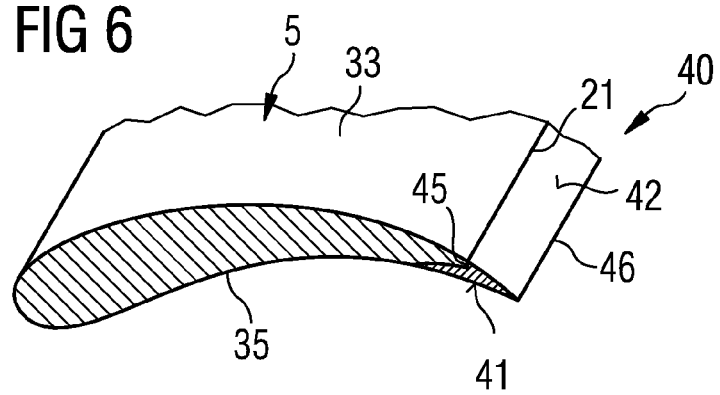
FIG. 6 schematically shows part of a wind turbine rotor blade with an inventive rotor blade element in a perspective and sectional view.

FIG. 6 shows part of an inventive rotor blade 5 to which an inventive rotor blade element 40 is mounted. The inventive rotor blade element 40 is glued or taped with its contact surface 44 to the concave portion 39 of the pressure side 35 of the rotor blade 5 at the trailing edge 21. The trailing edge 21 is attached to the trailing edge flange 45.

The suction side 33 and the suction side portion 42 of the rotor blade element 40 form an even surface, especially with the same convex curvature. Ideally, there is a smooth change from the suction side 33 of the rotor blade 5 to the suction side portion 42 of the rotor blade element 40. The first surface 41 provides a smooth change to the pressure side 35 of the rotor blade 5 and prolongs the pressure side 45 at the trailing edge 21 of the rotor blade 5.

Figure 7:
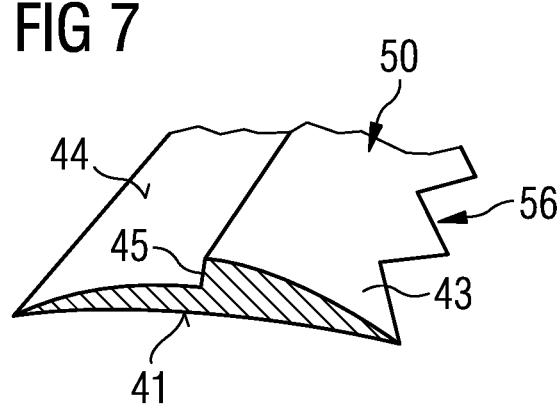
FIG. 7 schematically shows a further variant of part of an inventive wind turbine rotor blade element in a perspective view.
Figure 8:
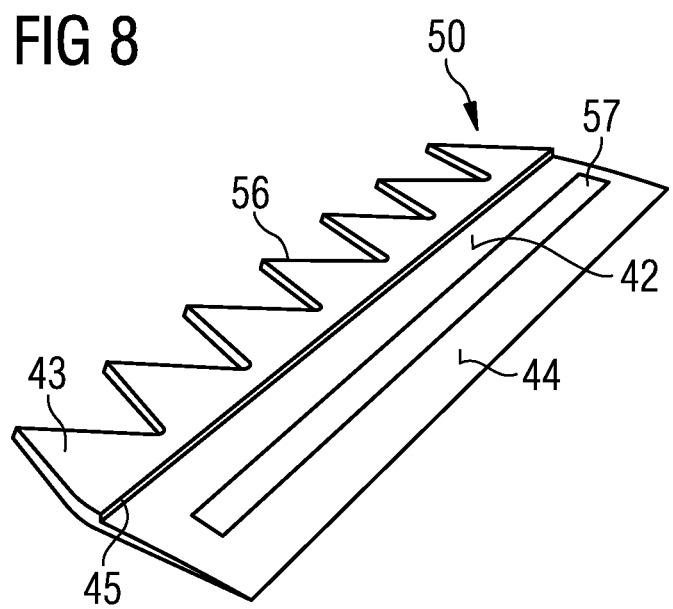
FIG. 8 schematically shows the rotor blade element of FIG. 7 equipped with a double-sided adhesive tape in a perspective view.

FIGS. 7 and 8 show a further variant of an inventive rotor blade element 50 with a serrated trailing edge 56. In FIG. 7 part of the rotor blade element 50 is shown in a sectional and perspective view. In FIG. 8 the rotor blade element 50 is shown in a perspective view onto its second surface 42. In the FIGS. 7 and 8 the trailing edge 56 of the rotor blade element 50 has a serrated shape. Furthermore, in FIG. 8 the contact surface 44 comprise a double-sided adhesive tape 57, for example, for connecting the rotor blade element 50 to the pressure side 35 of the rotor blade 5, as shown in FIG. 6.

Figure 9:
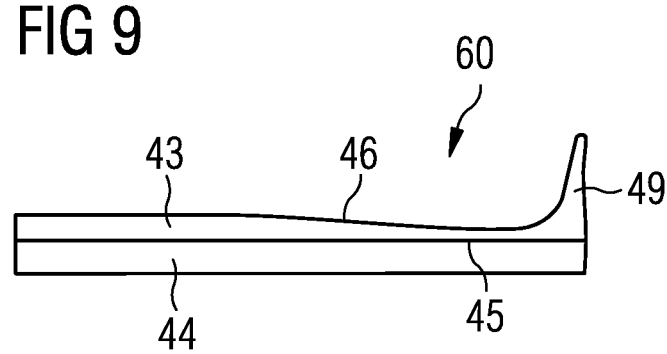
FIG. 9 schematically shows another variant of an inventive rotor blade element with a winglet.

FIG. 9, schematically shows another variant of an inventive rotor blade element 60. The blade element 60 comprises a winglet 49 which will ensure to reduce the fall-speed through open air for the blade element 60 in case that it falls down from a height, for example. This increases the safety for personnel in the vicinity of the turbine.

The invention claimed is:

1. A wind turbine rotor blade, comprising:
   a trailing edge;
   a suction side;
   a pressure side;
   and a plurality of rotor blade elements to be mounted on the wind turbine rotor blade, wherein each of the plurality of rotor blade elements comprises:
   a first surface comprising a pressure side surface portion; and
   a second surface comprising a suction side surface portion and a contact surface for connecting the rotor blade element to a pressure side surface portion of the wind turbine rotor blade; and
   further comprising a trailing edge flange located between the contact surface and the suction side surface portion for attaching the rotor blade element to the trailing edge of the wind turbine rotor blade.

2. The wind turbine rotor blade as claimed in claim 1, wherein the rotor blade element comprises elastic material.

3. The wind turbine rotor blade as claimed in claim 1, wherein the rotor blade element comprises plastic material and/or thermoplastic material and/or a composite structure.

4. The wind turbine rotor blade as claimed in claim 1, wherein the rotor blade element has a length of between 0.4 m and 1.0 m.

5. The wind turbine rotor blade as claimed in claim 1, wherein the rotor blade element comprises a double-sided adhesive tape for fixing the rotor blade element to the rotor blade.

6. The wind turbine rotor blade as claimed in claim 1, wherein the rotor blade element comprises a serrated trailing edge.

7. The wind turbine rotor blade as claimed in claim 1, wherein the rotor blade element comprises a winglet.

8. The wind turbine rotor blade as claimed in claim 1, wherein the rotor blade comprises a tip, and wherein the rotor blade element extends along a whole length of the trailing edge of the rotor blade or along a length of the trailing edge of the rotor blade of at least 8 m measured from the tip.

9. The wind turbine rotor blade as claimed in claim 1, wherein the rotor blade element is fixed to the rotor blade by glue and/or by a double-sided adhesive tape.

10. The wind turbine rotor blade as claimed in claim 1, wherein the rotor blade is used for a wind turbine.

11. The wind turbine rotor blade as claimed in claim 1, wherein the rotor blade element is fixed to the rotor blade by glue and/or by a double-sided adhesive tape.

\* \* \* \* \*